United States Patent

[11] 3,536,144

| [72] | Inventors | William R. Hood and<br>Kenneth W. Osburn, Blackwell, Oklahoma |
|---|---|---|
| [21] | Appl. No. | 648,478 |
| [22] | Filed | June 23, 1967 |
| [45] | Patented | Oct. 27, 1970 |
| [73] | Assignee | Blackwell Steel Products Inc.<br>Blackwell, Oklahoma<br>a corporation of Oklahoma |

[54] ARTICULATED WHEELED FRAME FOR AGRICULTURAL IMPLEMENTS
14 Claims, 8 Drawing Figs.

[52] U.S. Cl. ........................................... 172/311,
172/456
[51] Int. Cl. ........................................ A01b 49/00
[50] Field of Search ........................................ 172/310,
311, 456

[56] References Cited
UNITED STATES PATENTS

| 2,828,680 | 4/1958 | Johnson | 172/456X |
| 3,033,296 | 5/1962 | Kaufman et al. | 172/311X |
| 3,256,942 | 6/1966 | Van Sickle et al. | 172/310 |
| 3,373,822 | 3/1968 | Hornung | 172/311 |

FOREIGN PATENTS

| 273,806 | 7/1966 | Australia | 172/311 |

Primary Examiner—Robert E. Pulfrey
Assistant Examiner—James W. Peterson
Attorney—Robert E. Breidenthal ABSTRACT: This invention has to do with articulated agricultural frames of the type wherein a center frame can be tilted from a horizontal usage position to a vertical transport position, with outer frames being hinged at articulation axes to the center frame for vertical movement when the latter is in use and for horizontal movement when the latter is in transport position for transverse retraction during transport. Transverse rock shafts are rotatably mounted on the frame and are coupled to each other at the articulation axes by universal joints. The rock shaft of the center frame is provided with a pair of rearwardly and downwardly extending wheel struts each carrying a ground support wheel, while each of the other rock shafts is similarly provided with a single strut and wheel. The ground wheels are disposed intermediate a plurality of earth working elements carried by the frames. The rock shaft of the center frame has an upstanding arm fixed thereto, with hydraulic extensible means having its opposite ends connected to the tongue and the upper end of the arm.

Patented Oct. 27, 1970

INVEN
WILLIAM R. HOOD
KENNETH W. OSBURN

Robert E Breidenthal

ATTORNEY

Patented Oct. 27, 1970

INVENTOR.
WILLIAM R. HOOD
KENNETH W. OSBURN

BY *Robert E Breidenthal*

ATTORNEY

ARTICULATED WHEELED FRAME FOR AGRICULTURAL IMPLEMENTS

This invention relates to new and useful improvements in agricultural implements of the type that includes an articulated frame, and more particularly pertains to an improved means for controlling the vertical height of the central as well as the outer frames above the ground.

Agricultural implements such as to include articulated frames are enjoying increasing popularity. Exemplary of prior art proposals of agricultural implements incorporating articulated frames are the following U.S. Pats.: No. 3,298,446, Anderson, Jan. 17, 1967; No. 2,828,680, Johnson, Apr. 1, 1958; No. 3,033,296, Kaufman et al., May 8, 1962; No. 3,072,201, Brakhage, Jan. 8, 1963; No. 3,255,830, Groenke, June 14, 1966; No. 3,227,225, Hunter, Jan. 4, 1966; No. 2,599,251, Garrett, June 3, 1952; No. 2,641,886, Graham, June 16, 1953; and No. 2,286,619, Hokanson, June 16, 1942.

It is an object of this invention to provide an agricultural implement of the same general character as exemplified in the disclosures of the above listed patents (the disclosures of such patents being incorporated herein by reference), wherein the outer or wing sections of the frame as well as the center frame is supported by ground support wheels when the implement is in use, and wherein the center frame can be tilted upwardly and forwardly from its generally horizontal position of usage into a substantially vertical transport position with the outer or wing frames swung forwardly to transport positions thereof such as to be approximately at right angles to the center frame, rather than being substantially coplanar therewith during the articulated frame being in its condition for usage. It is therefore an object of the present invention that the articulated frame be such as to be movable into a transport condition somewhat analogous to the transport condition of the structure disclosed in U.S. Pat. No. 2,970,658 entitled Harrow Transport which issued to Kopaska on Feb. 7, 1961. While as stated, the present invention has objectives somewhat analogous to those of the Kopaska U.S. Pat. No. 2,970,658, particularly with respect to providing an articulated frame such that the outer frames can be swung inwardly into transversely retracted positions about vertical or steeply inclined axes when the center frame is tilted to its transport condition, such objectives of the Kopaska patent referred to above are substantially modified in that it is an objective of the present invention that the outer frames be provided direct support from the ground when the outer frames are in operative position and free to swing vertically relative to the center frame. The objectives of the present invention are further distinguished from those of the Kopaska U.S. Pat. No. 2,970,658 in that the height of support of the frames from the ground be adjustable in such a manner as not to disturb the tilting of any of the frames about the horizontal pivotal axis or connection of the center frame to the tongue structure.

Another important object of the present invention is to provide an articulated frame structure such as described above wherein tilting of the frames about the pivotal connection to the tongue will result in raising the frames when the frames are tilted from their positions of use toward their transport positions.

Another object of the present invention is to provide a structure wherein a common means will simultaneously raise and lower the center as well as the outer frames.

Another important objective of the present invention is to enable relative height adjustments of the outer frames about the ground with respect to the height at which the center frame is supported from the ground.

A broad aspect of the present invention involves, in an agricultural implement of the type including a center frame section hingedly connected to a forwardly extending draft tongue for tilting about a horizontal transverse axis, means connected between the tongue and the center frame section for tilting and securing the center frame section in selected tilted relation to the tongue, and outer frame sections disposed on opposite sides of the center frame section and being hingedly connected thereto about spaced, coplanar, frame articulation axes that are substantially horizontal and parallel to the line of advance of the implement during use of the latter, each of the frame sections being adapted to carry an earth working element; the combination therewith of ground support means comprising a primary rock shaft rotatably mounted on the center frame section, said primary rock shaft being coplanar with and normal to the frame articulation axes, said primary rock shaft having its opposite ends disposed in close proximity to positions along said articulation axes, a pair of secondary rock shafts rotatably mounted respectively on said outer frame sections, each of said secondary rock shafts being normal to the articulation axis nearest thereto and being in alignment with said position along such articulation axis and having an end in proximity to such position, flexible, rotary drive means at each of said positions operatively connecting the opposite ends of the primary rock shaft to said ends of the secondary rock shafts, a radially extending arm secured to the primary rock shaft, elongated means having opposite ends operatively connected respectively to the arm and the tongue for fixing the spacing of its operative connections to the arm and the tongue, and each of said rock shafts being provided with a downwardly inclined, radially extending member rockable therewith provided with wheel mounting means spaced from such rock shaft.

More limited aspects of the invention involve the primary rock shaft being spaced laterally from the transverse axis, whereby the primary rock shaft is rocked relative to the center frame on tilting movement of the center frame relative to the tongue, and wherein each of the rotary drive means is a universal joint having a pair of axes that are mutally perpendicular and which are coplanar with the frame articulation axis with which such rotary drive means is associated.

Yet another broad aspect of the invention involves in an agricultural implement of the type wherein a center frame is tiltable forwardly and upwardly about a horizontal transverse pivotal connection thereof to a draft tongue from a generally horizontal position of use to a transport position, and wherein outer frames are disposed on opposite sides of the center frame and are hingedly connected to such opposite sides of the center frame about axes that are horizontal and substantially perpendicular to the pivotal connection of the tongue and center frame when the latter is in its position of use, whereby the axes are upwardly inclined when the center frame is tilted to its transport position and the outer frames can be swung about such axes into transversely retracted transport positions, means being provided to control the tilting of the center frame; the improvement comprising a jointed rock shaft including a primary rock shaft and a pair of secondary rock shafts mounted for rotation respectively on the center and outer frames, said primary rock shaft being parallel to and spaced from the pivotal connection of the center frame to the tongue, universal joints disposed at the articulation axes and respectively connecting opposite ends of the primary rock shaft to adjacent ends of the secondary rock shafts, the arrangement being such that a given axial angular movement imparted to the primary rock shaft drives a corresponding axial angular movement of the secondary rock shafts with respect to their respective outer frames in a manner substantially independent of the positions occupied by the outer frames with respect to the center frame about the articulation axes, said primary rock shaft having a pair of spaced, parallel primary wheel struts radially extending downwardly therefrom, primary ground support wheels mounted upon the lower ends of the primary wheel struts, each of said secondary rock shafts having a secondary wheel strut extending radially therefrom that is provided with a secondary ground support wheel thereon, an actuating arm fixed to and radially extending from the primary rock shaft, extensible and retractable means having opposite extremities pivotally connected to the arm and to the tongue, and said frames being adapted to have earthworking elements attached in depending relationship thereto, whereby the primary and secondary ground wheels can be raised and lowered relative to their respective frames when the center frame is tilted to its position of use.

A more limited aspect of the invention involves each of the secondary wheel struts being pivotally connected to its respective secondary rock shaft together with threaded means for actuating pivotal movement of such secondary wheel strut relative to its respective secondary rock shaft.

An important feature of the present invention resides in the provision of hydraulic actuating means connected between the tongue and the center frame in such a manner that the tilt of the center frame with respect to the tongue is solely a function of such hydraulic means, and wherein the primary rock shaft is connected to the tongue in such a manner that the rock shaft will be rocked in response to actuation of either of the hydraulic means, namely, the hydraulic means connected between the center frame and the tongue or the hydraulic means connected between the tongue and the primary rock shaft.

Another important structural feature of the present invention resides in the primary and secondary rock shafts being directly connected by universal joints at the positions of the frame articulation axes, with wheel struts secured to each of the rock shafts.

Still another structural feature of importance resides in the provision of threaded means in conjunction with a pivotal connection of a wheel strut to a rock shaft, whereby the angular relationship of the wheel strut with respect to its respective rock shaft can be adjusted selectively.

These and other objects, aspects, features and advantages of the present invention will become apparent during the ensuing description of a preferred embodiment of the invention, such description to be taken in conjunction with the accompanying drawings illustrative of such preferred embodiment of the invention, wherein:

FIG. 7 is an enlarged fragmentary side elevational view of the threaded means provided for independent adjustment of the ground support wheel for one of the outer frames, this view being taken upon the vertical plane indicated by the line 7–7 in FIG. 1; and FIG. 8 is an enlarged central vertical sectional view of one of the threaded adjustment means such as shown in FIG. 7.

Figure 1:
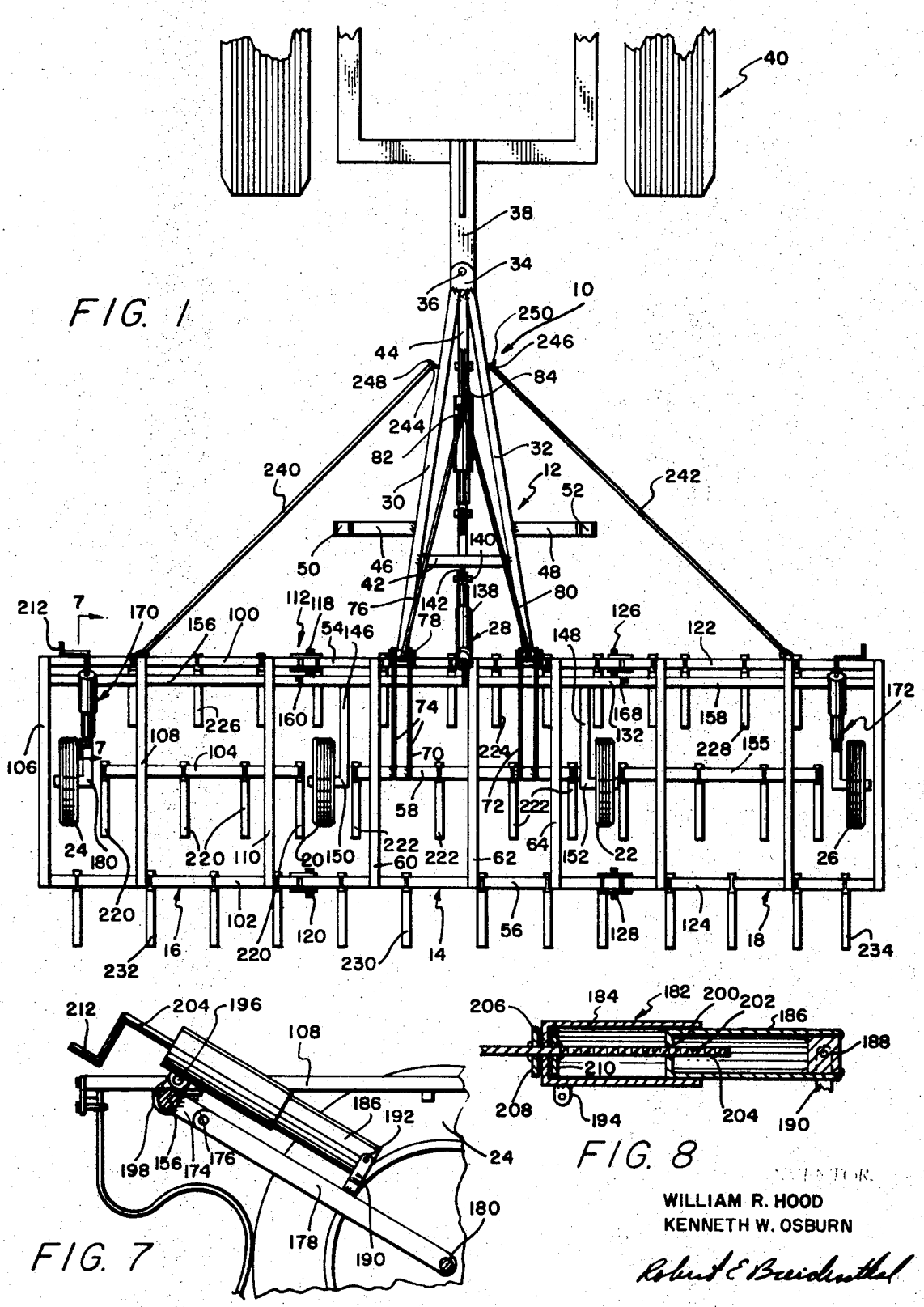
FIG. 1 is a top plan view of the implement of this invention, the same being shown with its frames in their positions of use, and the implement being shown attached to the drawbar of a partially illustrated tractor.

Referring now to the drawings, wherein like numerals designate like parts throughout the various views, the reference numeral 10 designates the implement of this invention generally. The implement 10 comprises a tongue designated generally at 12 which is connected to an articulated frame structure comprised of a center frame indicated generally at 14, and outer frames respectively designated generally at 16 and 18. The implement 10 additionally comprises ground wheels 20, 22, 24, and 26, together with control means for such ground wheels designated generally at 28.

The tongue structure 12 comprises a pair of rearwardly diverging members 30 and 32 which are joined at their forward ends, as by welding or the like, to a coupling structure such as a clevis 34 for detachable pivotal coupling by a pin 36 to the drawbar 38 of a tractor or suitable towing vehicle indicated generally at 40. The members 30 and 32 are rearwardly diverging and intermediate their forward and rear ends, such members are joined by a cross brace 42 welded therebetween. The tongue structure 12 also includes a central member 44 disposed between the members 30 and 32, the member 44 having its forward end welded to the coupling structure 34 and having its rear end welded to the cross brace 42.

For a purpose that will subsequently become apparent, the side members 30 and 32 of the tongue structure 12 are provided with laterally and upwardly extending support members 46 and 48 which at their free ends terminate in upwardly opening support yokes 50 and 52, such support yokes 50 and 52 being disposed at a height above the substantially horizontal plane of the tongue structure members 30, 32, 42 and 44, such yokes 50 and 52 being disposed forwardly of the center frame 14 and having a spacing preferably less than the transverse extent of the center frame 14.

The center frame 14 is an open, generally rectangular framework comprised of transversely extending, longitudinally parallel spaced, front and rear tool bars 54 and 56, together with an intermediate, transversely extending tool bar 58 disposed in spaced relationship intermediate and parallel to the tool bars 54 and 56. The tool bars 54, 56 and 58 are coplanar and are rigidly held in fixed relationship to each other by means of overlying, longitudinally extending, parallelly spaced frame members 60, 62 and 64, each of such frame members abutting and being welded to each of the tool bars 54, 56 and 58.

Figure 5:
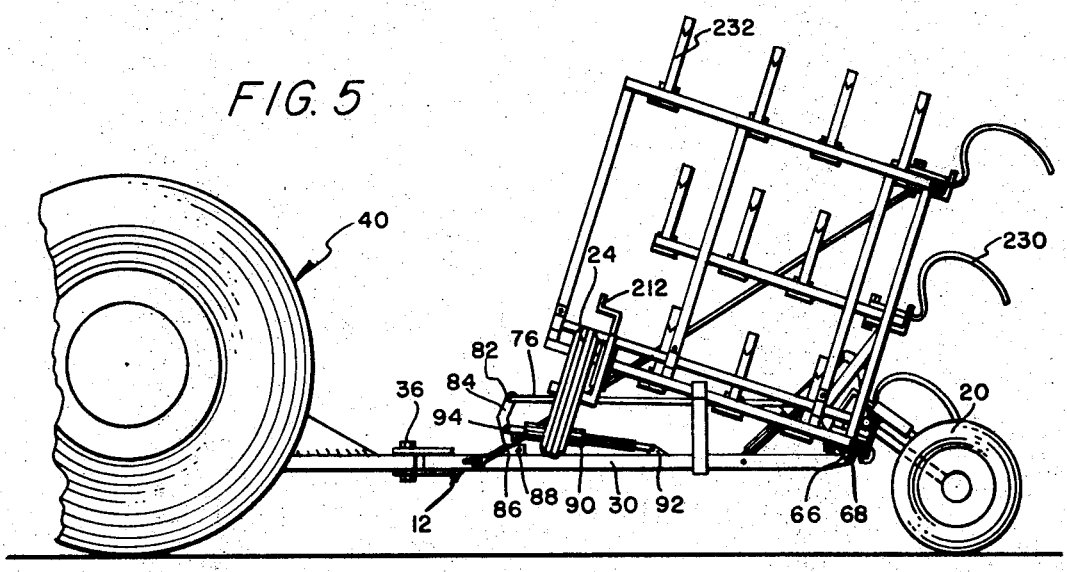
FIG. 5 is another side elevational view generally similar to FIG. 4, however, this view shows the outer frames as having been swung around forwardly from the positions shown thereof in FIG. 4 to their transport positions.

The forward tool bar 54 is provided spaced pairs of depending apertured ears, such as indicated at 66 in FIG. 5, and the rear ends of the tongue members 30 and 32 are received between the spaced ears of each of such pairs of ears 66, and pivot pins or bolts 68 pivotally attach each of the members 30 and 32 to the tool bar 54 by passing through suitably aligned apertures or openings through such tongue members and the mounting brackets or ears 66. The bolts or pivot pins 68 establishing the pivotal connections at the rear ends of the tongue members 30 and 32 to the frame 14 and in axial alignment and define a horizontal transverse axis that is perpendicular to the vertical medial plane of the implement 10, as will be evident to those skilled in the art. Such pivotal connection between the tongue 12 and the center frame 14 enables the frame 14 to swing vertically about the transverse horizontal axis defined by the pivots 68 from the generally horizontal operative position of the center frame 14 to a generally vertical or transport position thereof as will be subsequently described.

Hydraulic means is provided connecting between the center frame 14 and the tongue 12 for controlling the tilt of the center frame 14 with respect to the tongue 12 about the transverse axis defined by the pivots 68. Such means comprises a pair of upstanding, generally inverted V-shaped brackets 70 and 72 fixed to the tool bars 54 and 58. The bracket 70 is comprised of a pair of V-shaped steel straps disposed in parallelism and having their free ends welded to the upper surfaces of the tool bars 54 and 58. The apices of the straps 74 constituting the bracket 70 receive therebetween the rear end of an actuator rod 76, a pivot pin or bolt 78 extending through aligned apertures in the apices of the straps 74 and the rear end of the actuator rod 76 therebetween. The rear end of an actuator rod 80 is pivotally described with respect to the bracket 70 and the actuator rod 76.

The actuator rods 76 and 80 are forwardly convergent and have their forward ends pivotally secured by a pivot pin or bolt 82 to the upper end of an actuator lever 84. The lower end of the actuator lever 84 is pivotally mounted for swinging movement about a horizontal transverse axis upon the tongue member 44 by means of a mounting bracket 86 and a pivot pin 88.

Figure 2:
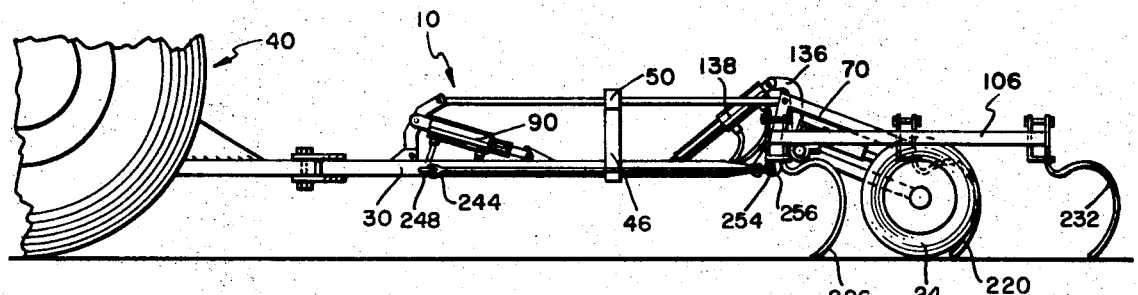
FIG. 2 is a side elevational view of the structure shown in FIG. 1, the ground wheels being shown in such a position that the earthworking elements thereof are withdrawn from penetration in the ground.
Figure 3:
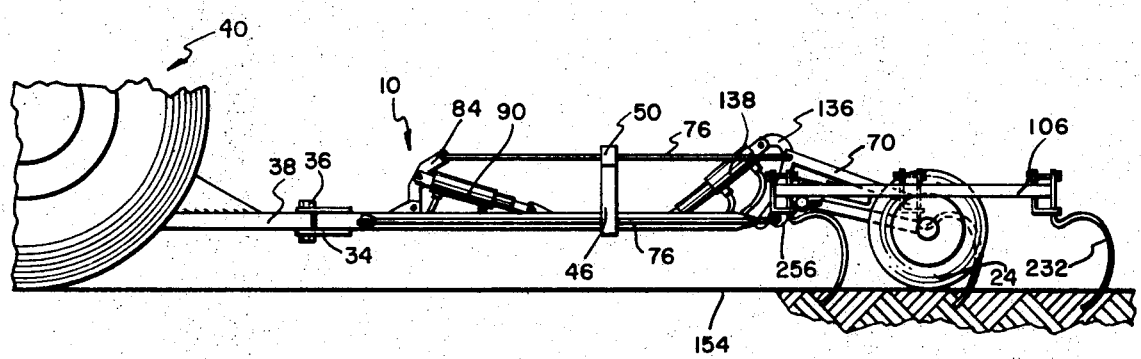
FIG. 3 is a side elevational view similar to FIG. 2; however, this view showing the ground wheel raised relative to the frame so that the earthworking elements are in ground penetrating position.
Figure 4:
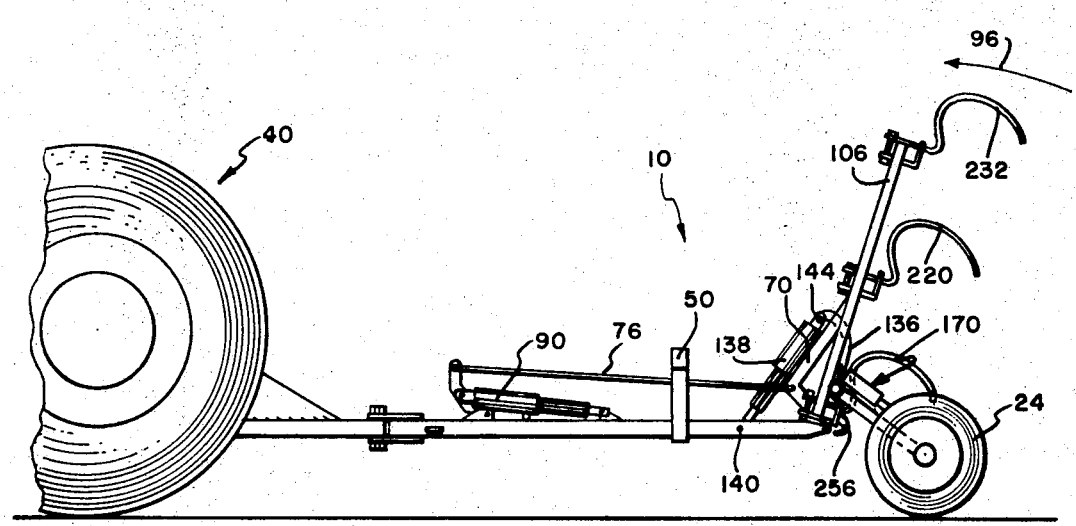
FIG. 4 is a side elevational view of the apparatus shown in FIGS. 1 through 3, this view showing the frames as having been tilted upwardly and forwardly by hydraulic frame tilting means.

As thus far described, it will be evident that anticlockwise movement of the actuator lever 84 about the pivot 88 at its lower end in a counterclockwise direction as shown in FIGS. 2 through 5 will result in causing the frame 14 to tilt about the transverse axis constituting its pivotal connection to the tongue 12 in an anticlockwise direction so as to move, for example, from the relative positions shown thereof in FIG. 3 to the relative positions shown thereof in FIG. 4. Conversely, clockwise movement of the actuator lever 84 about the pivot 88 at its lower end will result in corresponding clockwise tilting movement of the frame 14 relative to the tongue 12.

Hydraulic means is provided for actuating swinging movement of the lever 84 to effect tilting the frame 14 either clockwise or anticlockwise, and to restrain the lever 84 against swinging movement thereof from any selected position. Such hydraulic means comprises a double-acting hydraulic cylinder and piston rod combination indicated at 90 having its opposite ends pivotally connected to the tongue 12 at 92 and to the lever 84 at a position 94 intermediate the upper and lower ends of the lever 84. It will be evident to those skilled in the art that introduction of hydraulic fluid into the hydraulic cylinder 90 in such a manner as to cause extension of the piston rod therefrom and corresponding increase in the overall length thereof will impart an anticlockwise movement of the lever 84 about its lowermost pivot 88 as seen in FIGS. 2 through 5, and therefore tend to force tilting movement of the frame 14 in the direction indicated by the arrow 96 in FIG. 4. Conversely, introduction of hydraulic fluid into the hydraulic cylinder 90 in such a manner as to force contraction in the length thereof will result in forcing clockwise swinging movement of the lever 84 and corresponding tilting movement of the frame 14 in the direction opposite the arrow 96 in FIG. 4.

Inasmuch as double-acting hydraulic cylinder and piston rod combinations as well as control valves, pumps and connecting lines are well known in the art, illustration of such details are omitted from the drawings as inclusion thereof would serve only to obscure the invention, and inasmuch as such details do not in and of themselves constitute the present invention, it sufficing to note that as in conventional hydraulically actuated agricultural implements, the hydraulic pump and valve control means therefor are disposed normally on the towing vehicle or tractor 40 in such a position as to be readily accessible to the operator thereof. It will also be well understood by those familiar with the art that not only can hydraulic fluid be admitted so as to force selectively extension or contraction of the hydraulic means 90, the hydraulic fluid can be so constrained that the hydraulic means 90 can be selectively held fixed at any selected degree of extension.

The outer frames 16 and 18 are generally similar to the center frame 14, and the outer frames 16 and 18 are identical to each other to the extent that they are symmetrical with respect to the central or medial vertical plane of the implement 10. As in the case of the center frame 14, the outer frame 14 comprises front, rear and intermediate tool bars 100, 102 and 104 generally corresponding respectively to the previously described tool bars 54, 56 and 58, and are in alignment therewith respectively when the frames 14 and 16 are disposed as shown in FIG. 1. Frame members 106, 108 and 110 overlie the tool bars 100 and 102 and abut and are welded to such tool bars, it being noted that the frame members 108 and 110 additionally abut and are welded to the tool bar 104.

The frame 16 is hingedly or pivotally connected to the frame 14 by means to be described, whereby the frame 16 may be swung vertically about a horizontal longitudinal axis when the frame 14 is in the position shown thereof in FIG. 1. Such means comprises the tool bars 54 and 100 terminating in close proximity to each other, and there being pivotally connected hinge structure 112 best shown in FIG. 6. The hinge structure 112 comprises a pair of plates 114 and 116 welded to the opposite sides of the tool bar 100, and projecting to overlap the tool bar 54 on opposite sides of the latter. A pivot pin or bolt 118 extends through aligned apertures in the tool bar 54 and the overlapping portions of the straps or plates 114 and 116. The tool bars 56 and 102 are pivotally connected in the same manner as previously described in connection with the tool bars 54 and 100, the pivotal connection between the tool bars 56 and 102 including a pivot pin 120. The pivot pins 118 and 120 are in alignment so as to define an axis of articulation for relative swinging movement of the frame 16 relative to the frame 14.

In a similar manner tool bars 122 and 124 of the frame 18 are pivotally connected respectively to the other ends of the tool bars 54 and 56 by pivot pins 126 and 128. The pivot pins 126 and 128 are in alignment and establish an axis of articulation for swinging movement of the frame 18 relative to the center frame 14. The axes of articulation defined by the pivot pins 118 and 120, and 126 and 128 are parallel to each other as well as to the planes of the frames common thereto, such axes of articulation additionally being disposed so as to move through or define vertical planes that are parallel to the central plane of the implement 10 during tilting movement of the frame 14 described previously.

The means 28 for adjustably supporting the frames 14, 16 and 18 from the ground comprises the center frame 14 having journaled thereon a primary rock shaft 132, the primary rock shaft 132 being parallel to the tool bar 100, substantially coextensive therewith, and disposed rearwardly therefrom. The primary rock shaft 132 is disposed immediately beneath the frame member 60, 62 and 64 and is rotatably positioned in bearing straps secured to the underside of such frame members 60, 62 and 64 such as the bearing strap 134 shown in FIG. 6 in relation to the frame member 60. At a position centered between the opposite ends of the rock shaft 132, the latter has rigidly fixed thereto as by welding or the like the lower end of an actuation arm 136 that extends radially upward therefrom. Preferably though not necessarily, the upper end portion of the actuation arm 136 is curved rearwardly as will be evident upon inspection of FIGS. 2 through 4. A conventional double-acting hydraulic cylinder piston rod combination 138 is provided which corresponds generally to the previously described hydraulic cylinder and piston rod combination 90. The extensible and retractable hydraulic means 138 has one end pivotally connected at 140 to a mounting ear 142 that is fixed to the center of the tongue cross brace 42. The axis of the pivotal connection 140 is horizontal and transverse with respect to the longitudinal extent of the implement 10. The hydraulic means 138 is upwardly and rearwardly inclined from its pivotal connection 140 and has its rearward end pivotally connected at 144 to the free extremity of the actuation arm 136. The arrangement is such that if the extent of the hydraulic means 90 is held fixed, extension of the hydraulic means 138 such as to increase the facing between the pivotal connections 140 and 144 will result in clockwise rocking movement of the rock shaft 132 with respect to the center frame 14 as viewed from the left side of the implement 10. Conversely, retractile movement of the hydraulic means 138 such as to decrease the spacing between the pivotal connections 140 and 144 will result in counterclockwise rocking movement of the rock shaft 132 relative to the frame 14 as viewed from the left of the implement 10.

As will be readily understood, valving means and hydraulic lines are operatively connected to the hydraulic means 138 in association with a hydraulic pump, whereby the hydraulic means 138 can be forcibly increased in its extent or forcibly decreased in extent, and held at any selected extent, as in the case of the hydraulic means 90. Such valving means, hydraulic pump and connecting hydraulic lines are not shown in the drawings inasmuch as they would only obscure the invention and for the reason that such structure is conventional. It will be understood as in the case of the hydraulic means 90, the valving controls associated with the hydraulic means 138 are preferably conveniently disposed adjacent the operator's position of the towing vehicle or tractor 40. It will also be appreciated that conventional tractors 40 commonly include a hydraulic pump to furnish a source of pressurized hydraulic fluid in association with the hydraulic fluid reservoir, and in normal usage of the implement 10, both the hydraulic means 90 and 138 are operatively coupled to such source of hydraulic fluid energy.

A pair of parallel, spaced wheel struts 146 and 148 are fixedly secured, as by welding or the like, to the rock shaft 132, such wheel struts 146 and 148 being symmetrically positioned with respect to the medial vertical plane of the implement 10. The wheel struts 146 and 148 are disposed so as to extend downwardly and rearwardly from the rock shaft 132, and the free ends of such wheel struts are provided with aligned stub axles 150 and 152, respectively, upon which the ground wheels 20 and 22 are respectively mounted for rotation.

As thus far described, it will be evident that clockwise rotation or rocking movement of the rock shaft 132 as viewed from the left of the implement 10 will cause a downward swinging movement of the ground wheels 20 and 22 with respect to the central frame 14, whereby the frame 14 will be supported upon the ground surface 154 at a relatively higher position. Thus, to effect a raising of the frame 14, the hydraulic means 138 is actuated to be further extended in length. Conversely, actuation of the hydraulic means 138 to retract or shorten the spacing of its pivotal connections 140 and 144 will result in counterclockwise rotation or rocking movement of the rock shaft 132 and a consequent lowering of the frame 14 with respect to the ground surface 154.

It is important to appreciate that the arrangement thus far described is also such that when the hydraulic means 138 is held fixed in its extent, actuation of the hydraulic means 90 in such a manner as to tilt the frame 14 upwardly and forwardly about its transverse horizontal axis of connection to the frame 12 will result in causing rotation or rocking movement of the rock shaft 132 in a clockwise direction as viewed from the left of the implement 10 with respect to the frame 14, thus in turn forcing relative downward movement of the ground support wheels 20 and 22 so as to produce a net effect of raising the position of the rock shaft 132 relative to the ground surface 154. It will be noted that whereas operation of the hydraulic means 138 does not in and of itself cause any pivotal motion of the center frame 14 with respect to the tongue 12, actuation of the hydraulic means 90 will in and of itself effect a rocking movement of the rock shaft 132 with respect to the frame 14 to produce the results just described.

The intermediate tool bar 58 of the frame 14 is of lesser extent than the tool bars 54 and 56 in order to accommodate or afford clearance for the struts 146 and 148 as well as for the ground wheels 20 and 22 upon rocking movement of the primary rock shaft 132. It will be noted that the ground wheels 20 and 22 are disposed in such spaced relationship transversely as to be adjacent the previously described articulation axes defined by the pivots 118 and 120, and 126 and 128. The relationship is such that the ground wheels 20 and 22 are adjacent the tool bar 104 of the frame 16 and the corresponding tool bar 155 of the frame 18, sufficient clearance being afforded therebetween so that the tool bars 104 and 155 will not come into engagement with the wheels 20 and 22 on articulation movement of the frames 16 and 18 even when the hydraulic means 90 and 138 are fully retracted.

Figure 6:
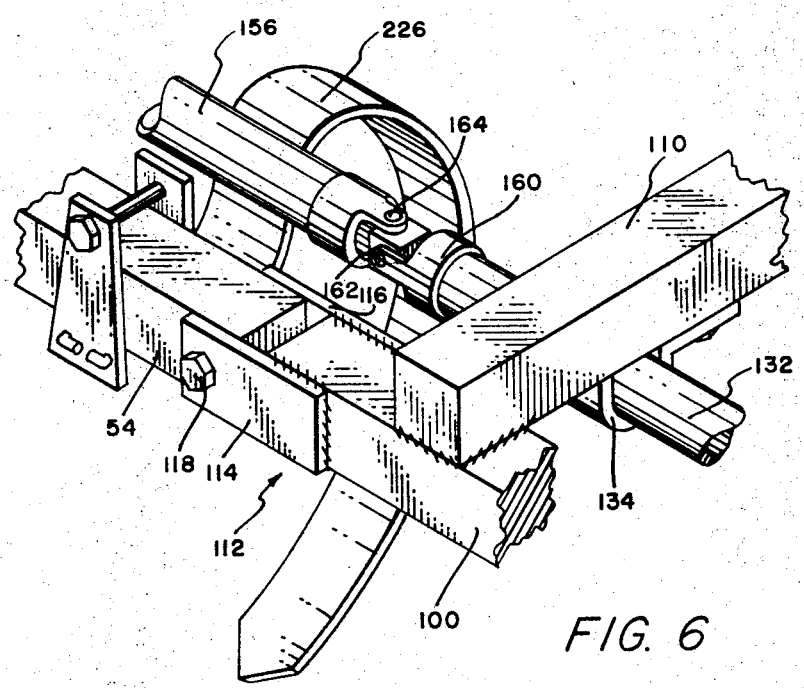
FIG. 6 is an enlarged fragmentary isometric detail view illustrating in particular the spatial relationship of a universal joint connecting rock shafts to the pivotal connection between the center frame and one of the outer frames.

Mounted respectively upon the frames 16 and 18 in the same manner that the primary rock shaft 132 is mounted on the frame 14 are secondary rock shafts 156 and 158. The adjacent ends of the primary rock shaft 132 and the second rock shaft 156 terminate in close proximity to each other, and each of such rock shafts are aligned with the articulation axes defined by the pivots 118 and 120 and are connected at such articulation axes by a universal joint 160 as best shown in FIG. 6. The universal joint 160 defines a rotary drive coupling between the primary and secondary rock shafts 132 and 156, and the universal joint 160, which is in itself conventional, has two pivotal axes 162 and 164 that are mutually perpendicular and coplanar with the axis of articulation defined by the pivots 118 and 120. In other words, the axes 162, 164 and the articulation axes defined by the pivots 118 and 120 intersect in a point, the arrangement being such that the rotary drive coupling between the primary and secondary rock shafts 132 and 156 is effective during pivotal motions of the frames 14 and 16 relative to each other about their common articulation axis. Accordingly, rocking motion of the primary rock shaft 132 relative to its respective center frame 14 actuates a corresponding rocking movement of the secondary rock shaft 156 relative to its respective frame 16.

The secondary rock shaft 158 of the frame 18 bears the same relationship thereto as the rock shaft 156 bears to the frame 16, and additionally, a universal joint 168 connects the primary and secondary rock shafts 132 and 158 with the same relationship to the articulation axis defined by the pivots 126 and 128 that the universal joint 168 bears to the articulation axis defined by the pivots 118 and 120.

Adjacent their remote extremities, the secondary rock shafts 156 and 158 are provided with adjustable wheel strut structures 170 and 172 upon which are respectively mounted the ground support wheels 24 and 26. Since the wheel strut structures 170 and 172 are essentially identical, a detailed description of the wheel strut structure 170 will suffice for both. For an appreciation of the wheel strut structure 170, attention is directed to FIGS. 7 and 8, wherein it will be seen that the secondary rock shaft 156 has fixedly attached thereto a short radially extending arm or ear 174, and the free end of the ear 174 has pivoted thereto at 176 a wheel strut 178, the arrangement being such that the downwardly and rearwardly extending wheel strut 178 can be swung about the axis of the pivotal connection 176 so as to raise and lower the wheel 24, the latter being mounted upon an outwardly turned portion 180 of the strut 178. The pivotal connection 176 between the ear 174 and the strut 178 has an axis parallel to the rock shaft 156. In order to actuate pivotal motion of the wheel strut 178 about its connection 176 and in order to retain the wheel strut 178 in selected angular relationship with respect to the secondary rock shaft 156, a threaded means now to be described is provided, such threaded means being designated generally by the reference numeral 182.

The threaded means 182 for adjusting the angle of the wheel strut 178 comprises a pair of telescoping hollow cylinders 184 and 186. The free end of the smaller cylinder 186 is reinforced by having a plug 188 fixed therein, and such reinforced free end of the cylinder 186 is received within a yoke structure 190 rigidly fixed to the strut 178, and trunnions 192 are fixed to the opposite sides of the cylinder 186 and pivotally received in suitable apertures in the yoke structure 190. The larger cylinder 184 is provided adjacent its free end with an apertured ear 194 which is pivotally secured at 196 to an ear 198 rigidly fixed to the secondary rock shaft 156. The arrangement is such that retractile telescoping movement of the cylinders 184 and 186 results in upward swinging movement of the ground wheel 24 about the pivot 176, and telescopic extension of the cylinders 184 and 186 results in downward swinging movement of the ground wheel 24. In order to effect extension and retraction of the telescoping relationship of the cylinders 184 and 186, the inner end of the smaller cylinder 186 is provided with a fixed end wall 200 having a central threaded opening 202, through which a threaded adjustment rod 204 threadingly extends coaxially within the cylinders 184 and 186. In a similar manner, the free end of the larger cylinder 184 is provided with an apertured wall 206, the rod 204 being journaled through the aperture in the end wall 206. Endwise movement of the rod 204 through the end wall 206 is prevented by the rod 204 having fixed thereto a pair of stop rings 208 and 210 disposed in closely spaced sliding relationship on the opposite sides of the end wall 206. The arrangement is such that rotation of the adjustment rod 204 in one direction retracts the smaller cylinder 186 into the cylinder 184, with rotation in the opposite direction causing extension of the smaller cylinder 186. Externally of the cylinder 184, the rod 204 is bent to form a hand crank portion 212, whereby turning movement of the adjustment rod 204 may be effected. Whereas the crank 210 can be turned to effect adjustment of the angular position of the wheel strut 178 in a convenient manner, the pitch of the threads on the rod 204 is such that compression or tensile forces exerted on the cylinders 184 and 186 will not effect a turning motion of the rod 204, and accordingly, save for adjustment made by means of the crank 212, the position of the wheel strut 178 is effectively fixed with respect to the secondary rock shaft 156.

At a position intermediate the range of adjustment afforded by the threaded means 182, the axis of the wheel 24 is substantially in alignment with the axes of the wheels 20 and 22 when the frames 14 and 16 are coplanar; however, the threaded means 182 enables an independent adjustment of the height of the end of the frame 16 remote from the frame 14 as may be desired, such as may be indicated to be desirable for reasons such as where the center frame wheels travel in the tractor tracks, to compensate for any error or misalignment in the securance of universal joints, or when an outer frame wheel travels on relatively higher or lower ground as about the periphery of a field.

The frames 14, 16 and 18 are shown for purposes of illustration of the invention as having the tool bars thereof provided with spring teeth; however, it will be appreciated that the illustrated spring teeth are merely exemplary of a large class of differing types of ground working implements that can be secured in spaced relationship along each of the tool bars of each of the frames. Exemplary of other types of earthworking elements which can be secured to the various tool bars so as to depend therefrom in an array over an area preceding, following and intermediate the ground support wheels 20, 22, 24 and 26 may be mentioned stubble mulch plows, seeding attachments, fertilizer attachment units, rotary type tillers and disc plows or colter wheels.

It is to be noted on inspection of FIG. 1 that during the use of the implement 10, the axes of the ground wheels 20, 22, 24 and 26 lie approximately in a vertical plane common to that of the tool bars 58, 104 and 154 and that the spring teeth 220 of the tool bar 104 are disposed intermediate the ground wheels 20 and 24. Similarly, the spring teeth dependingly mounted on the tool bar 154 are disposed intermediate the ground wheels 22 and 26. Also, the spring teeth 222 of the tool bar 58 are disposed intermediate the ground wheels 20 and 22.

The relationship of the ground support wheels is such that the spring teeth 224, 226 and 228 respectively of the frames 14, 16 and 18 are disposed forwardly of the ground wheels, while the spring teeth 230, 232 and 234 respectively of the frames 14, 16 and 18 are disposed rearwardly of the ground wheels. Such disposition of the ground wheels with respect to the groundworking implements carried by the frames results in the frames 14, 16 and 18 being each carried at a height best representative or most efficiently responsive to the actual contour of the ground surface 154 over which the earthworking elements are being moved.

While the ground support wheels 24 and 26 provide effective support for the outer frames 16 and 18 at positions closely adjacent the outermost transverse ends of such frames, it is additionally desirable to provide draft for such frames adjacent their outermost extremities. For this purpose elongated draft members or rods 240 and 242 are provided, the forward ends of such rods being formed with eye portions 244 and 246 that are engaged about or embrace forwardly and upwardly turned hooks 248 and 250 that are rigidly fixed to the tongue members 20 and 32 respectively. During use of the implement 10, the rods 240 and 242 are arranged to diverge rearwardly and have their rear ends formed as eyes 254 detachably engaged with hooks 256 rigidly fixed to the tool bars 100 and 122 adjacent the outer extremities of the latter.

The operation of the implement 10 will be readily understood. With the implement 10 disposed with its frames in their horizontal operative conditions or positions shown in FIG. 1, and with the draft members 240 and 242 attached to the outer frames 16 and 18 as shown in FIG. 1, the implement 10 is drawn by the tractor 40, and the operator can by operation of his controls of the hydraulic means 138 control the vertical height of the frames in their support upon the ground surface by the ground wheels, this by virtue of the rocking motion imparted to the primary rock shaft 132 controlling the vertical position of the wheels 20 and 22 with respect to the frame 14, and by virtue of the driving connections of the primary rock shaft 132 to the secondary rock shafts 156 and 158 concurrently controlling the vertical positions of the ground wheels 24 and 26 with respect to their respective outer frames 16 and 18, it being mentioned again that a modest degree of fixed relative adjustment can be provided for the ground wheels 24 and 26 by means of the means 170 and 172. The effective swivel connections of the rods 240 and 242 at each of their opposite ends enable the outer frames 16 and 18 to swing vertically about their respective articulation axes so that the earthworking elements carried by such outer frames can best conform to varying contour of the ground surface being worked.

As mentioned above, the depth of penetration of the ground by the earthworking elements, such as the illustrated spring teeth, is controlled by actuation of the hydraulic means 138, and whenever desired, the operator can raise such earthworking elements from the position shown thereof in FIG. 3 to the position shown thereof in FIG. 2 or higher in order to discharge or permit to fall free any trash or the like that may have accumulated about such earthworking elements.

When the operator desired to move the implement a substantial distance between points of use, and especially when the implement 10 must traverse an interval of narrow lateral clearance such as between gate posts or along a road, the operator disengages the rear ends of the rods 240 and 242 from the outer frames 16 and 18 and then actuates the hydraulic means 90 to tilt the frames upwardly and forwardly as indicated by the arrow 96 in FIG. 4. As described earlier, such tilting of the frames is accompanied by relative forward and downward movement of the ground wheels which serve to raise the frames and further contributes to raising the implement as well as effecting a separation of the earthworking elements from the ground.

It will be noted that during such tilting of the frames, the outer frames 16 and 18 obtain direct support from the ground surface through their respective ground wheels. After the frames have been tilted to such an extent as their articulation axes are approaching vertical such as to correspond to the condition of the implement shown in FIG. 5, the rearmost extents of the rods 240 and 242 may be raised to rest upon the rearmost tool bar 56 of the center frame 14, the forward ends of such rods being left attached to the tongue 12. Then the outer frames 14 and 16 are swung forwardly until the toolbars 100 and 122 thereof are disposed approximately directly above the previously described support yokes 50 and 52, after which the hydraulic means 90 is effected to cause a slight additional amount of forward tilting of the frame 14 sufficient to seat and to allow the tool bars 100 and 122 to rest upon the support yokes 50 and 52. This results in each of the frames and indeed all the components of the implement 10 to be in what may be referred to as their transport positions, and the implement 10 can then be drawn to such distant point of use as may be desired. Upon arriving at the distant point of use, the procedure followed to place the implement 10 in its transport condition is reversed and the implement operated as previously described in connection with FIG. 1.

It will be noted that when the implement is placed in such a condition that the articulation axes approach a vertical condition, very little physical effort is then required to swing the outer frames 16 and 18 to their transport condition, it being noted that is preferred that such articulation axes not be placed in a perfectly vertical position, but at a position such as to be inclined upwardly and rearwardly so that the ground wheels 24 and 26 are raised at least to some extent above the ground surface when the frames are swung forwardly as will be apparent upon inspection of FIG. 5.

It is to be observed that in restoring the implement 10 to its use condition shown in FIG. 1 from the condition shown in FIG. 5, the swinging outwardly and rearwardly of the outer frames 16 and 18 will result in bringing the ground support wheels 24 and 26 into contact with the ground at a position such that the frames 14, 16 and 18 are substantially coplanar.

While hydraulic tilting means and hydraulic rock shaft actuating means are preferred for ease of operating convenience (especially when the tractor, as is very often the case, includes a source of pressurized hydraulic fluid and a reservoir for such fluid) and for the speed, power, and economy of space enjoyed when such means are employed, it will be quite evident that many forms of mechanical means of considerable mechanical advantage in performing an extension and retraction function are well and long known in the art, and accordingly, though not preferred, such mechanical means can be employed in lieu of either or both of the illustrated and described hydraulic means in the practice of the invention. If mechanical means are to be used, then it is preferred that the same be such as can be power driven from the mechanical power takeoff with which conventional tractors are customarily provided, rather than such as require the application of manual force or physical labor.

The illustrated preferred form of the invention has been described in elaborate detail in order to assure a full and complete understanding thereof, and no implication of narrowness of invention is to be implied by the degree of such detail. Obviously, numerous variations and departures from the illustrated form of the invention can be made without departing from the actual scope of the invention. Accordingly, attention is directed to the appended claims in order to ascertain the actual scope of the invention.

We claim:

1. In an agricultural implement of the type including a center frame section hingedly connected to a forwardly extending draft tongue for tilting about a horizontal transverse axis from an operative generally horizontal position to a substantially vertical transport position, hydraulically actuated means connected between fixed portions of the tongue and the center frame section for tilting and uniquely determining the tilt of the center frame section relative to the tongue, and outer frame sections disposed on opposite sides of the center frame section and being hingedly connected thereto about spaced, coplanar, frame articulation axes that are substantially horizontal and parallel to the line of advance of the implement during use of the latter, each of the frame sections being adapted to carry an earthworking element, the combination therewith of ground support means comprising a primary rock shaft laterally spaced from the hinged connection of the center frame section to the tongue and rotatably mounted on the center frame section, said primary rock shaft being coplanar with and normal to the frame articulation axes, said primary rock shaft having its opposite ends disposed in close proximity to positions along said articulation axes, a pair of secondary rock shafts rotatably mounted respectively on said outer frame sections, each of said secondary rock shafts being normal to the articulation axis nearest thereto and being in alignment with said position along such articulation axis and having an end in proximity to such position, flexible rotary drive means at each of said positions operatively connecting the opposite ends of the primary rock shaft to said ends of the secondary rock shafts, a radially extending arm secured to the primary rock shafts, a second hydraulically actuated means having relatively movable opposite ends pivotally connected respectively to the arm and to the tongue for controlling the spacing of its pivotal connections to the arm and the tongue, and each of said rock shafts being provided with a radially and downwardly extending member rockable therewith that is provided adjacent its lowermost end with wheel mounting means.

2. The combination of claim 1, wherein said primary rock shaft is spaced laterally from the transverse axis, whereby said primary rock shaft is rocked relative to the center frame section on tilting movement of the latter relative to the tongue.

3. The combination of claim 1, wherein said arm is upwardly inclined from the primary rock shaft with the latter being disposed rearwardly of said transverse axis, and wherein a geometrically straight line between the pivotal connections of the second means is above the hinged connection of the center frame section to the tongue, whereby the primary rock shaft is rocked relative to the center frame section in response to tilting of the center frame section relative to the tongue in a direction opposite to the direction of tilting of the center frame section.

4. The combination of claim 1, wherein said elongated means is variable in length and includes means for controlling the length thereof.

5. The combination of claim 1, wherein each of said rotary drive means is a universal joint having a pair of axes that are mutually perpendicular and which are coplanar with the frame articulation axis at the position of the rotary drive means along the articulation axis.

6. The combination of claim 1, wherein one of said members is pivotally connected to its respective rock shaft for relative angular movement about an axis parallel to such rock shaft with means for securing such member against relative angular movement at a selected angular relationship.

7. The combination of claim 1, wherein said primary rock shaft has two of said members, such members being downwardly and rearwardly inclined and have ground wheels mounted thereon having aligned axes of rotation below the center frame and to the rear and below the primary rock shaft, and said arm extending upwardly from the primary rock shaft, and wherein a geometrically straight line between the pivotal connections of the second means is above the hinged connection of the center frame section to the tongue, the arrangement being such that upward and forward tilting of the center frame section relative to the tongue rocks the primary rock shaft to move the ground wheels forwardly and downwardly relative to the center frame section.

8. The combination of claim 7, wherein the center frame is provided with a plurality of depending earthworking elements, said aligned axes of the ground wheels being positioned to the rear of the forwardmost of said earthworking elements when the center frame is generally horizontal in its position for usage of the earthworking elements.

9. In an agricultural implement of the type wherein a center frame is tiltable forwardly and upwardly about a horizontal transverse pivotal connection thereof to a forwardly extending draft tongue from a generally horizontal position of use to a generally vertical transport position, and wherein outer frames are disposed on opposite sides of the center frame and are hingedly connected to such opposite sides of the center frame about articulation axes that are horizontal and substantially perpendicular to the pivotal connection of the tongue and center frame when the latter is in its position of use, whereby the articulation axes are upwardly inclined when the center frame is tilted to its transport and the outer frames can be swung about such axes into transversely retracted transport positions, and wherein there is provided a power operable means connecting the center frame and the tongue for controlling and uniquely determining the tilt of the center frame relative to the tongue; the improvement comprising in combination therewith of a jointed rock shaft including a primary rock shaft and a pair of secondary rock shafts mounted for rotation respectively on the center and outer frames, said primary rock shaft being parallel to and spaced rearwardly from the axis of the pivotal connection of the center frame to the tongue, universal joints disposed at the articulation axes and respectively connecting opposite ends of the primary rock shaft to adjacent ends of the secondary rock shafts, the arrangement being such that a given axial angular movement imparted to the primary rock shaft relative to the center frame drives a corresponding axial angular movement of the secondary rock shafts with respect to their respective outer frames in a manner substantially independent of the positions occupied by the outer frames with respect to the center frame about the articulation axes, said primary rock shaft having a pair of spaced, parallel primary wheel struts radially extending downwardly and rearwardly therefrom, primary ground support wheels mounted upon the lower ends of the primary wheel struts, each of said secondary rock shafts having a secondary wheel strut extending downwardly and rearwardly therefrom that is provided at its lower end with a secondary ground support wheel thereon, an upstanding actuating arm fixed to the primary rock shaft, extensible and retractable means having opposite extremities pivotally connected to the arm and to the tongue for rocking the primary rock shaft relative to the center frame, said opposite extremities being disposed along a geometrically straight line spaced above the pivotal connection of the center frame to the draft tongue, and said frames being adapted to have earthworking elements attached in depending relationship thereto, whereby the primary and secondary ground wheels can be raised and lowered relative to their respective frames when the center and the outer frames are disposed in their substantially horizontal positions of use.

10. The combination of claim 9, wherein the extensible and retractable means is connected to the tongue at a location spaced from the pivotal connection of the latter to the center frame, and is also connected to the arm at a position above the rock shaft, whereby tilting of the center frame rock each of the rock shafts relative to its respective frame when the length of the extensible and retractable means is held fixed, the parts being so constructed and arranged that tilting the center frame toward its transport position lowers the primary support wheels relative to the center frame.

11. The combination of claim 9, including a pair of elongated draft members detachably and swively connected between the tongue and positions on the outer frames remote from the articulation axes.

12. The combination of claim 9, wherein each of the secondary wheel struts is pivotally connected to its respective secondary rock shaft whereby its respective ground wheel can be raised and lowered relative to its respective outer frame, and threaded means for actuating pivotal movement of such secondary wheel strut relative to its respective secondary rock shaft.

13. The combination of claim 9, wherein each of said frames is substantially rectangular and includes a plurality of spaced tool mounting bars parallel to and disposed on both sides of its respective rock shaft in the direction of the extent of the articulation axis of such frame, the arrangement being such that each frame receives ground support from within a ground area lying directly beneath such frame when such frame is in its position of use.

14. The combination of claim 1, wherein each of the radially extending members of the secondary rock shafts is disposed adjacent the end of its respective secondary rock shaft remote from the primary rock shaft.